(12) United States Patent
Mitra (10) Patent No.: US 6,920,290 B2
(45) Date of Patent: Jul. 19, 2005

(54) MULTI-WAVELENGTH HIGH BANDWIDTH COMMUNICATION RECEIVER AND SYSTEM

(75) Inventor: Pradip Mitra, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 616 days.

(21) Appl. No.: 09/903,330

(22) Filed: Jul. 11, 2001

(65) Prior Publication Data

US 2003/0011840 A1 Jan. 16, 2003

(51) Int. Cl.[7] .......................... H04J 14/02; H04B 10/06
(52) U.S. Cl. .......................... 398/207; 398/79; 398/82; 398/87; 398/202; 398/212
(58) Field of Search ............................. 398/79, 82, 87, 398/202, 207, 212, 85, 214

(56) References Cited

U.S. PATENT DOCUMENTS

| 4,322,693 | A | * | 3/1982 | Fry ............................... 372/60 |
| 5,315,128 | A | | 5/1994 | Hunt et al. .................... 257/16 |
| 5,389,797 | A | | 2/1995 | Bryan et al. ................... 257/21 |
| 5,455,421 | A | * | 10/1995 | Spears ....................... 250/338.4 |
| 5,479,018 | A | | 12/1995 | McKee et al. ............ 250/338.1 |
| 5,485,015 | A | | 1/1996 | Choi ............................... 257/21 |
| 5,539,206 | A | | 7/1996 | Schimert .................. 250/338.4 |
| 5,726,805 | A | | 3/1998 | Kaushik et al. .............. 359/589 |
| 5,773,831 | A | | 6/1998 | Brouns ................... 250/370.08 |
| 5,818,066 | A | | 10/1998 | Duboz ........................... 257/21 |
| 5,949,561 | A | * | 9/1999 | Goossen et al. ............... 398/79 |
| 6,233,380 | B1 | * | 5/2001 | Ferrieu .......................... 385/30 |
| 6,414,769 | B1 | * | 7/2002 | Meli et al. ..................... 398/79 |
| 2002/0009258 | A1 | * | 1/2002 | Coldren et al. ............... 385/24 |

OTHER PUBLICATIONS

J.-H. Lee, S.S. Li, M.Z. Tidrow, W.K.Liu, *Investigation of multi–color, broadband quantum well infrared photodetectors with digital graded superlattice barrier and linear–graded barrier for long wavelength infrared applications*, Infrared Physics & Technology, vol. 42, pp. 123–134, (2001).

Lucent Technologies Bell Labs Innovations Technical Paper, *Arrayed Waveguide Grating Multiplexer/Demultiplexer*, 6 pages (Jan. 2000).

(Continued)

*Primary Examiner*—M. R. Sedighian
(74) *Attorney, Agent, or Firm*—Sidley Austin Brown & Wood LLP; Stephen S. Sadacca (57) ABSTRACT

An array of diffraction grating coupled infrared photodetectors is coupled to corresponding high-speed amplifiers for creating a multiple channel high speed receiver for an optical communication system. Each photodetector includes a three-dimensional diffractive resonant optical cavity formed by a diffraction grating that resonates over a narrow range of wavelengths. By creating different resonant optical cavities, the receiver detects each optical channel individually, thereby simplifying receiver design. The receiver finds ready application in systems based upon high power $CO_2$ lasers and semiconductor lasers such as quantum cascade lasers allowing extremely long line of sight communication, such as between satellites. Other applications include ship to ship or ground to missile communications. These applications will benefit from increased jamming resistance and security.

50 Claims, 4 Drawing Sheets

OTHER PUBLICATIONS

H. C. Liu, *Quantum Well Infrared Photodetector Physics and Novel Devices, Intersubband Transitions in Quantum Wells, Physics and Device Applications I, Semiconductors and Semimetals*, vol. 62, cover page and pp. 129–196 (2000).

Feng–Qi Liu, Ding Ding, Bo Xu, Yong–Ahao Ahang, Quan–Sheng Zhang, Zhan–Guo Wang, De–Sheng Jiang, Bao–Quan Sun, *Strain–compensated quantum cascade lasers operating at room temperature, Journal of Crystal Growth*, vol. 220, pp. 439–443 (2000).

Jung–Hee Lee and Sheng S. Li, *Quantum–well infrared photodetectors with digital graded superlattice barrier for long–wavelength and broadband detection*, American Institute of Physics, vol. 75, No. 20, 3 pages (1999).

Alessandro Tredicucci, Claire Gmachi, Frederico Capasso, Deborah L. Sivco, Albert L. Hutchinson and Alfred Y. Cho, *A multiwavelength semiconductor laser, Nature*, vol. 396, pp. 350–353 (Nov. 26, 1998).

Ivars Melngailis, William E. Keicher, Charles Freed, Stephen Marcus, Brian E. Edwards, Antonio Sanchez, Tso Yee Fan and David L. Spears, *Laser Radar Component Technology, Proceedings of the IEEE*, vol. 84, No. 2, (Feb., 1996).

Jerome Faist, Frederico Capasso, Deborah L. Sivco, Carlo Sirtori, Albert L. Hutchinson, Alfred Y. Cho, *Quantum Cascade Laser, Science*, vol. 264, pp. 553–556 (Apr. 22, 1994).

C. C. Barron, C. J. Mahon, B. J. Thibeault, G. Wang, W. Jiang, L. A. Coldren and J. E. Bowers, *Resonant–cavity–enhanced* pin *photodetector with 17GHz bandwidth–efficiency product, Electronics Letters*, vol. 30, No. 21, pp. 1796–1797 (Oct. 13, 1994).

T. Wipiejewski, K. Panzlaff, K. J. Ebeling, *Resonant wavelength selective photodetectors, Microelectronic Engineering*, vol. 19, pp. 223–226 (1992).

* cited by examiner

MULTI-WAVELENGTH HIGH BANDWIDTH COMMUNICATION RECEIVER AND SYSTEM

FIELD OF THE INVENTION

The present invention relates to a multiple wavelength data optical communication receiver and system. In particular, the present invention provides for a receiver using diffraction grating coupled photodetectors tuned to the various wavelengths in the communication system.

BACKGROUND OF THE INVENTION

In the field of communication systems, a current objective is to provide ever-greater data bandwidths without requiring additional cabling or optical fiber lines. To this end, lightwave communication systems now use wavelength division multiplexing (WDM) in which multiple lightwave communication channels are transmitted over the same optical fiber by using a number of different wavelength channels. More recently, the spacing between these different wavelength channels has decreased, leading to dense WDM (DWDM) systems. The DWDM systems require a different laser wavelength for each wavelength channel. Additionally, a wavelength dispersive element such as an arrayed waveguide grating (AWG) is required to separate the different wavelength channels and to direct the resulting individual wavelength channels to different photodetectors.

The DWDM systems place very stringent requirements on a number of system components. The wavelength of each laser must be very carefully controlled, as a drifting laser wavelength will lead to crosstalk with adjacent wavelength channels. As the power of each laser is relatively limited and the optical fiber used in transmission is lossy, long fiber optic links require the added complexity of optical amplifiers at appropriate repeater intervals. Because the spacing between wavelength channels has decreased, the AWG must very accurately separate the different wavelength channels or crosstalk will likely occur. The strict tolerances on the AWG are due in part to the use of a single photodetector design for all wavelength channels. That is, the photodetector is responsive to light from each of the wavelength channels and cannot differentiate between the various wavelength channels.

SUMMARY OF THE INVENTION

In one embodiment of the present invention, a high bandwidth multi-wavelength receiver includes a plurality of photodetectors, with each photodetector comprising a plurality of intersecting elongate light absorbing elements, first and second electrical contacts, and a reflector, with the output from each photodetector being inputted to a high speed amplifier. The plurality of intersecting elongate light absorbing elements forms a two-dimensional diffraction resonant optical cavity that resonates at the wavelength channel of interest.

In another embodiment of the present invention, a high bandwidth wavelength division multiplexing optical communication system comprises at least one light source, an optical modulator array, a first optical disperser, and a plurality of photodetectors, with each photodetector comprising a plurality of intersecting elongate light absorbing elements, first and second electrical contacts, and a reflector, with the output from each photodetector being inputted to a high speed amplifier.

Another embodiment of the present invention is a method for receiving wavelength division multiplexing wavelength channels using a plurality of photodetectors, each photodetector comprising a plurality of intersecting elongate light absorbing elements, first and second electrical contacts, and a reflector, and amplifying the output from each photodetector.

Yet another embodiment of the present invention is a method for transmitting and receiving wavelength division multiplexing wavelength channels using one or more lasers. The method comprises modulating the output of the one or more lasers, receiving the modulated laser beams, dispersing the received modulated laser beams, and detecting the thus dispersed modulated laser beams with a plurality of photodetectors, each photodetector comprises a diffractive resonant optical cavity, and amplifying the output from each photodetector.

In each embodiment, one or more photodetectors per wavelength channel is envisioned with multiple photodetectors per wavelength channel providing improved sensitivity. Depending upon the wavelengths of the various wavelength channels, a number of different semiconductor material systems may be used to form the light absorbing elements and the first and second electrical contacts.

BRIEF DESCRIPTION OF THE DRAWINGS

The present invention is described in reference to the following Detailed Description and the drawings in which.

DETAILED DESCRIPTION OF THE PREFERRED EMBODIMENTS

Various embodiments of the present invention are described in detail with reference to the drawings with corresponding elements having corresponding numbers throughout the drawings.

Figure 1:
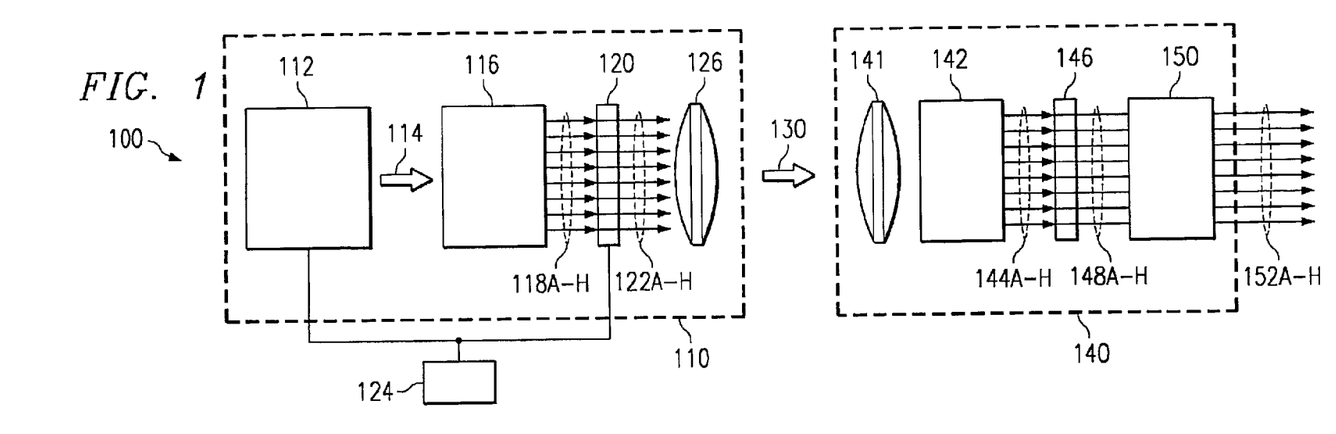
FIG. 1 is a system schematic for a multiple wavelength data communication system of a first embodiment of the present invention.

FIG. 1 is a general system schematic of a multiple wavelength data communication system 100 according to a first embodiment. The system includes a transmitter 110 and a receiver 140. The transmitter 110 includes a number of components. A laser 112 produces a multi-wavelength light beam 114 that illuminates a first optical disperser 116. The first optical disperser 116 divides the multi-wavelength light beam 114 into its components 118A–118H. Each of the components 118A–118H illuminates a respective element of an optical modulator array 120. The output of each respective element of the optical modulator array 120 is a separate transmitted wavelength channel 122A–122H encoded with data. An external controller 124 controls both the laser 112 and the optical modulator array 120. The controller 124 ensures proper output power from the laser 112. The controller 124 drives the optical modulator array 120 according to the data to be transmitted.

Figure 2:
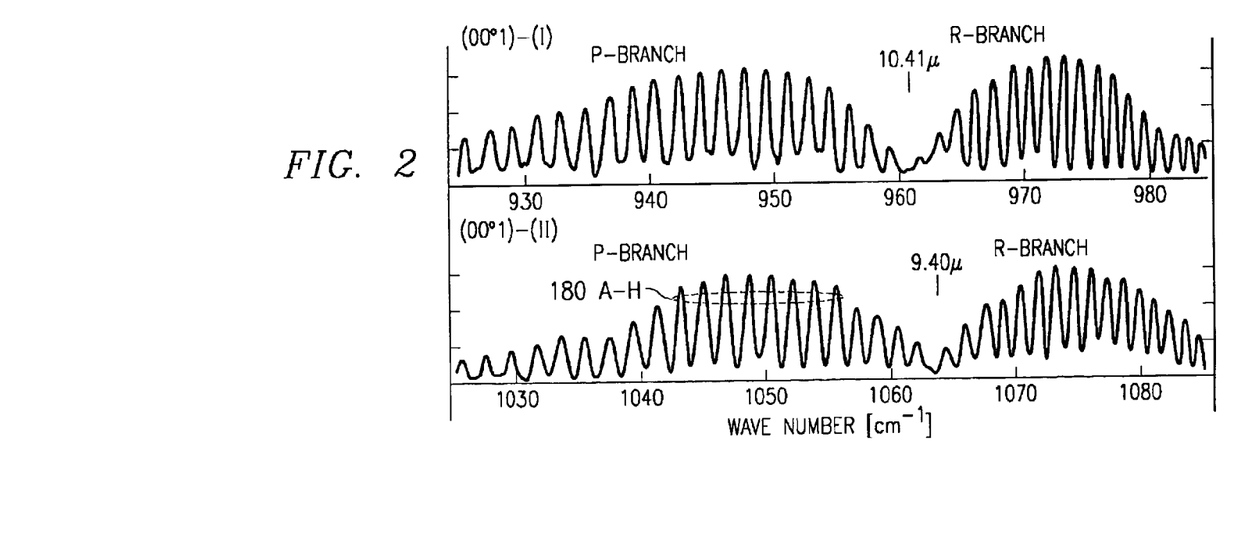
FIG. 2 is the spectral output of a $CO_2$ laser as used with an embodiment of the present invention.

In a preferred embodiment, the laser 112 is a $CO_2$ laser lasing at a number of wavelengths. FIG. 2 illustrates a few of these wavelengths 180A–180H. With a $CO_2$ laser, the multi-wavelength light beam 114 may have nearly 100 different wavelengths when both P and R laser transitions are included, leading to an extremely high bandwidth data communication system 100.

An alternative laser source for laser 112 would be a multi-wavelength quantum cascade laser. These lasers have demonstrated their usefulness in applications requiring radiation with wavelengths in the middle wavelength IR (MWIR or 3–5 $\mu$m) and long wavelength IR (LWIR or 8–12 $\mu$m). Quantum cascade lasers can readily be designed and fabricated to lase at a number of different wavelengths and are significantly smaller than $CO_2$ lasers. Quantum cascade lasers would find ready application in line-of-sight applications in marine environments, such as between ships, where MWIR radiation has relatively low losses.

The first optical disperser 116 can be formed in a number of different ways. The preferred first optical disperser 116 can be a simple prism if the size of the transmitter 110 can be large. The simple prism will require a long distance between the first optical disperser 116 and the optical modulator array 120 if the individual wavelengths of the multi-wavelength light beam 114 are closely spaced. This is because the wavelength resolution of the prism increases as the distance between the prism and its projection image increases.

A first alternative for the first optical disperser 116 is an optical grating. An optical grating can readily be designed to cover the wavelengths of the multi-wavelength light beam 114. One drawback of an optical grating is its efficiency is polarization dependent. To achieve maximum throughput of the multi-wavelength light beam 114, precise control of the orientation between the laser 112 and the first optical disperser 116 is required.

A second alternative for the first optical disperser 116 is an array waveguide grating (AWG). An AWG offers an advantage over an optical grating in that each component 118A–118H of the multi-wavelength light beam 114 is more precisely separated and can more efficiently be coupled to the optical modulator array 120.

The use of multiple single wavelength lasers instead of a single laser for laser 112 removes the requirement for the first optical disperser 116. In particular, the use of a series of quantum cascade lasers, each lasing at a different wavelength, would not require the use of the first optical disperser 116.

The optical modulator array 120 is preferably comprised of electro-optical modulators. These electro-optical modulators can be based upon the Faraday effect, the Kerr effect, the Pockels effect or others. Each of these effects alters the polarization direction of the incident light beam and by using polarizers, the magnitude of the resultant exit beam can be controlled. Alternatively, optical shutters formed of multiple quantum well material have been demonstrated and would be compatible with the wavelengths of interest.

The controller 124 that drives the optical modulator array 120 can encode the transmitted wavelength channels 122A–122H using any of the modulating standards.

The modulated wavelength channels 122A–122H are combined using a first lens system 126 to form a composite transmitted laser beam 130. Depending upon the wavelengths used in the transmitter 110, optical fibers or line of sight may route the composite transmitted laser beam 130 to the receiver 140. In a $CO_2$ laser-based transmitter 110, the composite laser beam transmits directly in a line of sight, as low loss optical fibers for this wavelength range do not exist.

Depending upon the transmission media, optical fibers or air, or transmission distance, various lens configurations will be required in the first lens system 126 for optimal coupling and generation of the composite transmitted laser beam 130 for transmission.

The receiver 140 then receives the composite transmitted laser beam 130. The composite transmitted laser beam 130 is incident on a second lens system 141. The second lens system is required to provide optimal coupling between the composite transmitted laser beam 130 and a second optical disperser 142. The exact lens configuration for the second lens system 141 will depend upon the transmission media and the distance from the transmitter. For example, a telescope may be necessary if the distance is hundreds of kilometers. The second optical disperser 142 divides the composite transmitted laser beam 130 into separate received wavelength channels 144A–144H that correspond to separate transmitted wavelength channels 122A–122H. Each of the separate received wavelength channels 144A–144H illuminates a corresponding pixel of photodetector array 146. Each pixel of photodetector array 146 produces an output signal 148A–148H that feeds a respective channel of a high-speed amplifier 150. An amplified output data stream 152A–152H results from the high-speed amplifier 150.

In a second embodiment of the present invention, the second optical disperser 142 is not required. As will be discussed below, the pixels of photodetector array 146 resonate at different wavelengths. If the wavelengths used in transmitted wavelength channels 122A–122H are separate enough, the tuned resonance of each pixel in photodetector array 146 will cause each pixel to respond to only a single wavelength channel and reject all other channels. When the wavelength separation is relatively small, as will likely be the case in DWDM applications, the second optical disperser 142 of the first embodiment will be required.

Figure 3:
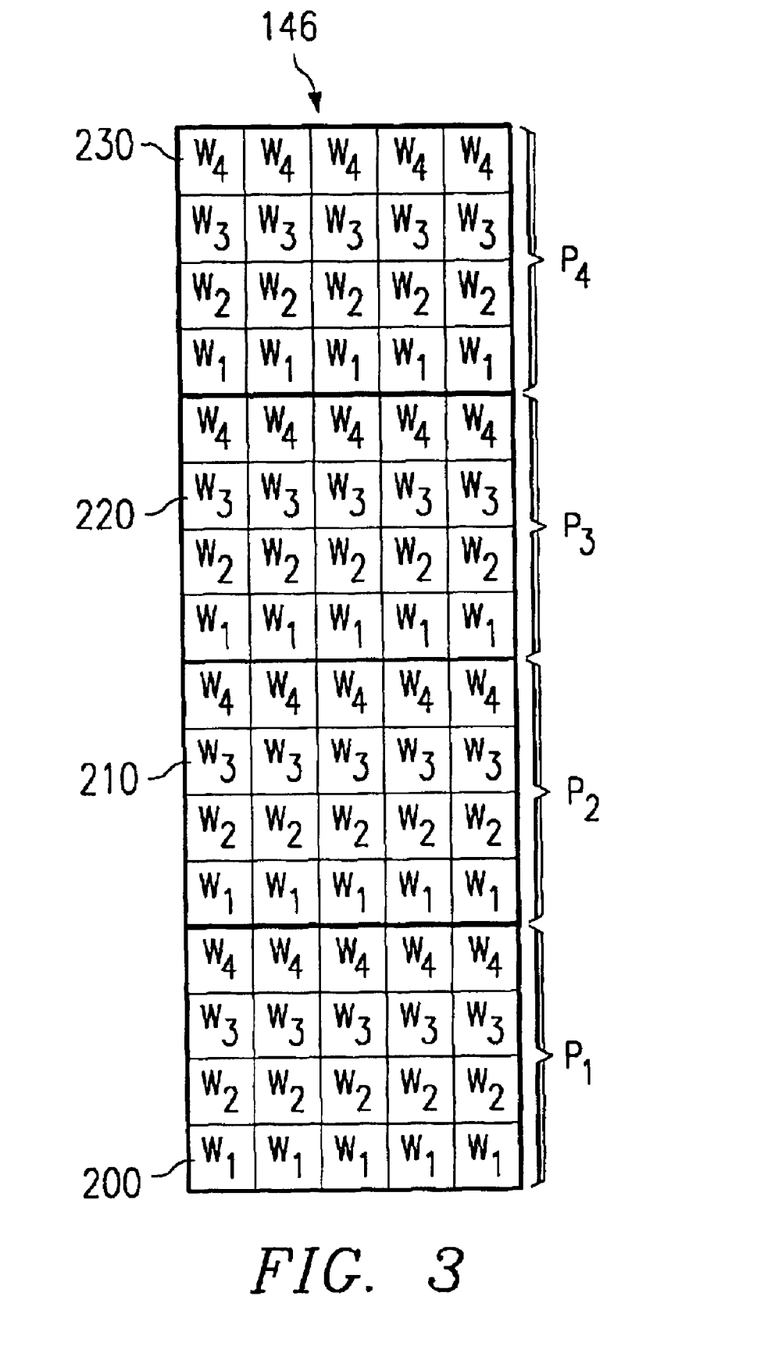
FIG. 3 is a general plan view of a plurality of photodetectors of a first embodiment of the present invention.

A principal component of the receiver 140 is the photodetector array 146. FIG. 3 illustrates an example photodetector array 146. This example photodetector array 146 is a 5×16 array of photodetector pixels including a number of individual photodetector pixels 200, 210, 220, 230.

The 5-photodetector pixel direction corresponds to a single one of the received wavelength channels 144A–144H. The use of multiple photodetector pixels per received wavelength channel serves several purposes. By using multiple photodetector pixels, the signal for a given received wavelength channel can be processed to reduce the noise. This processing may be averaging the signal across the photodetector pixels, or by using thresholds on each photodetector pixel and "voting" between an odd number of photodetector pixels depending on the modulation standard used. For highly fault tolerant applications, the use of multiple photodetector pixels for each received wavelength channel provides redundancy in case individual photodetector pixels fail over time.

The 16-pixel direction of the photodetector array 146 corresponds to the wavelength direction of the photodetector array 146. That is, each horizontal row of photodetector pixels responds to a different wavelength corresponding to a different wavelength channel. To ensure each row of photodetector pixels responds to only a narrow band of wavelengths, each row resonates at a different wavelength. The specifics of individual photodetector pixels will be described below, but the primary method for controlling the resonate wavelength of the photodetector pixels is the period, the width, and the thickness of the elongate elements. Thus, the period P1–P4 of the elongate elements will increase across the photodetector array 146 as the resonant wavelength increases. For a given period P1–P4, a width W1–W4 of the elongate elements will also increase as the resonant wavelength increases. Therefore, the combination of periods P1–P4 and widths W1–W4 of the elongate elements in this example will provide for sixteen different received wavelength channels 144A–144H.

When DWDM is used in conjunction with the second optical disperser 142, a different elongate element design of period and width may not be required. For a high-resolution second optical disperser 142, a sixteen-wavelength channel data communication system may require only four or eight different period and width combinations. In this case a single photodetector pixel design, i.e. P1 and W1, will resonate, and thus respond, to two or more different wavelength channels. Therefore, two or more rows in the wavelength direction can employ a single photodetector pixel design, simplifying the photodetector array 146 design process.

Figure 4:
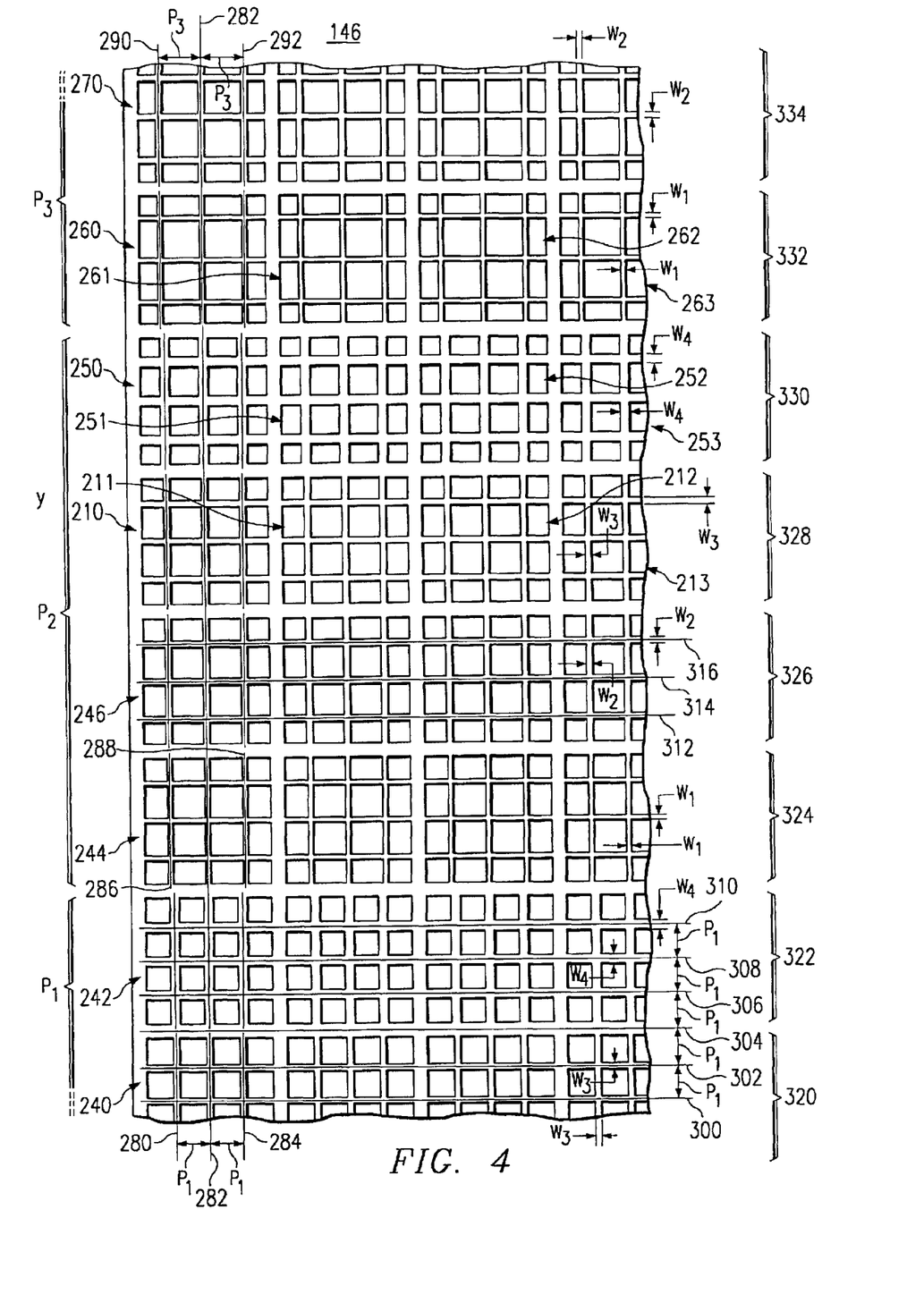
FIG. 4 is a detailed plan view of the plurality of photodetectors of the first embodiment of the present invention.

FIG. 4 is an enlargement of a portion of the photodetector array 146 shown in FIG. 3. FIG. 4 shows a number of individual photodetector pixels 210–213, 240, 242, 244, 246, 250–253, 260–263, 270. The photodetector pixels 240 and 242 each have a period P1, but differ as photodetector pixel 240 has an elongate element width of W3 while photodetector pixel 242 has an elongate element width of W4. As wider elongate element widths correspond to longer resonant wavelengths, photodetector pixel 242 will respond to a longer wavelength channel than photodetector pixel 240. Photodetector pixel 240 has a period P1 defined as the spacing between centerlines 280, 282, and 284. The same period P1 is replicated in the orthoginal direction as indicated by centerlines 300, 302, 304, 306, 308, and 310. The period P2, as found in photodetector pixel 246, is defined as the spacing between centerlines 286, 282, and 288 with an identical orthoginal period indicated by centerlines 312, 314, and 316. The period P3, as found in photodetector pixel 270, is defined as the spacing between centerlines 290, 282, and 292.

All of the photodetector pixels 210–213 in row 328 are identical and thus row 328 provides all of the signals associated with one wavelength channel. All of the photodetector pixels 251–253 in row 330 have slightly wider elongate elements than those of row 328 and therefore row 330 provides all of the signals associated with a wavelength channel having a longer wavelength than row 328. Thus, the portion of the photodetector array 146 illustrated in FIG. 4 includes row 320 responding to the shortest wavelength channel for the illustrated rows, through rows 322, 324, 326, 328, 330, 332, and 334, with row 334 responding to the longest wavelength channel for the illustrated rows. In the overall photodetector array 146 as seen in FIG. 3, photodetector pixel 200 will respond to the shortest wavelength channel while photodetector pixel 230 will respond to the longest wavelength channel.

Figure 5:
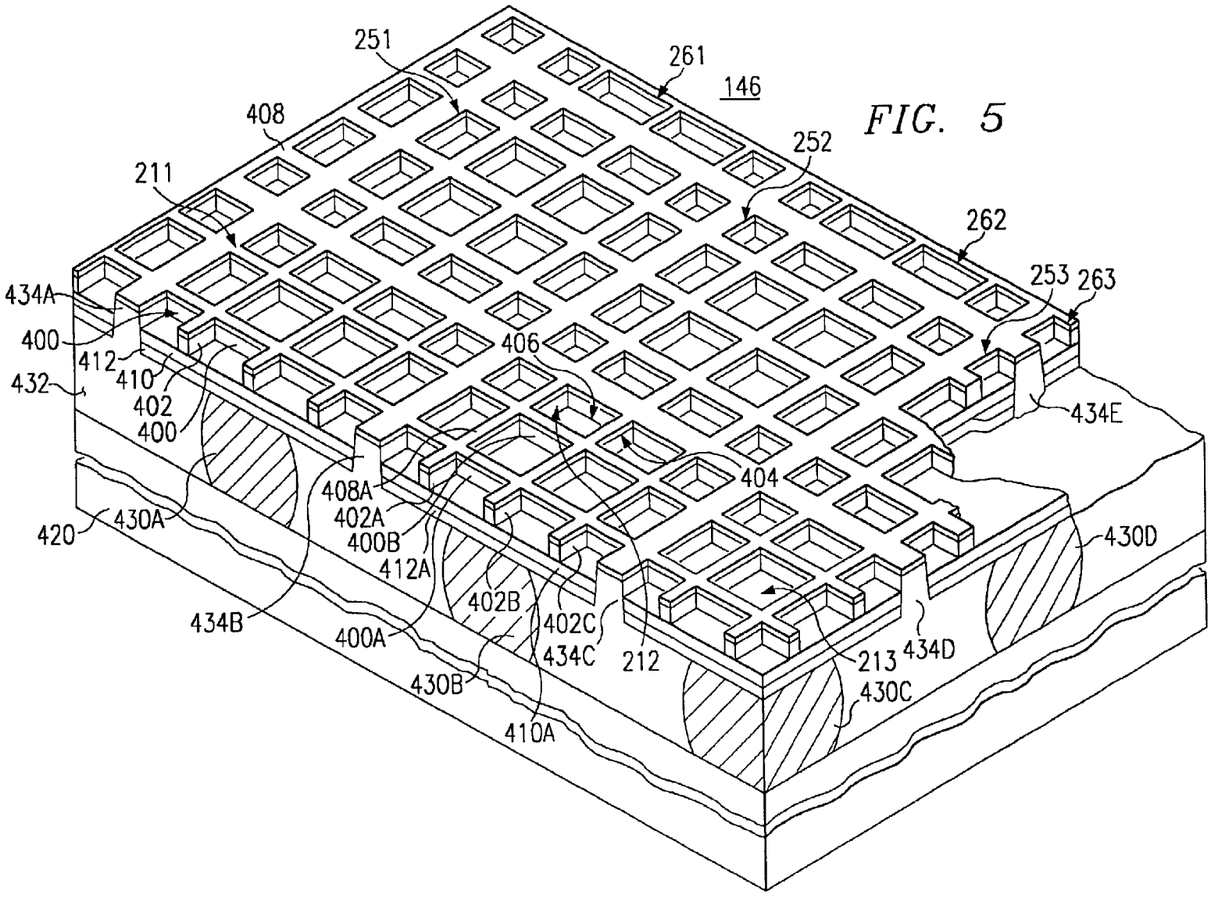
FIG. 5 is a perspective view of the plurality of photodetectors of the first embodiment of the present invention.

FIG. 5 is a perspective view of a portion of photodetector array 146. Photodetector pixel 212 of FIG. 5 includes first elongate elements 400A, 400B and second elongate elements 402A–402C for absorbing one of the received wavelength channels 144A–144H. A typical width W1–W4 for these elongate elements 400A, 400B, 402A–402C in a $CO_2$ laser communication system is 1–3 $\mu$m while a typical period P1–P4 is 6–9 $\mu$m. These elongate elements 400A, 400B, 402A–402C form first common major surface 404 and second common major surface 406, the second common major surface 406 being opposite the first common major surface 404. A first electrical contact 408A is formed on the first common major surface 404. A second electrical contact 410A is formed on the second common major surface 406. FIG. 5 shows a reflector 412, which includes a reflector 412A for specific photodector pixel 212 on a surface of the second electrical contact 410A opposite the second common major surface 406. Reflector 412A reflects a respective received wavelength channel 144A–144H incident on a particular photodetector pixel.

The photodetector array 146 as shown in FIG. 5 could be formed from planar starting semiconductor material. The various required layers would be grown on a substrate. Continuing the $CO_2$ example, a GaAs substrate could be used with appropriate layers of doped GaAs grown thereon to form the first electrical contact 408 and second electrical contact 410. Elongate elements 400, 402 could be formed of a GaAs/AlGaAs multiple quantum well $CO_2$ laser radiation absorbing material. This first electrical contact 408/elongate element 400, 402/second electrical contact 410 structure is similar to that used in quantum well infrared photodetectors (QWIPs) found in infrared photodetection applications. A typical thickness for the first electrical contact 408 and second electrical contact 410 layers is 0.4 $\mu$m while the elongate elements 400, 402 have a typical thickness of 1.2 $\mu$m.

Alternatively, the photodetector array 146 could be formed of photovoltaic semiconductor material. In this embodiment, the first electrical contact 408 would be formed of a highly doped n-type layer and the second electrical contact 410 of a highly doped p-type layer. The elongate elements 400, 402 would be formed of a semiconductor material having a p/n junction. As an example, for a communication system operating in the 1–2 $\mu$m wavelength region, a photodetector array 146 could be formed of appropriately doped InGaAs layers.

The photodetector pixel would be formed in part by removing a significant portion of the semiconductor material via a masked etch process to leave only the first electrical contact 408A and the elongate elements 400A, 400B, 402A–402C. The reflector 412A can be metal, preferably Au or a Au alloy, formed by an evaporation process. Alternatively, the reflector 412A could be a Bragg reflector and formed of suitable semiconductor or dielectric material layers.

In the preferred embodiment illustrated in FIGS. 1 and 5, the photodetector array 146 mates to a high speed amplifier integrated circuit 420. The integrated circuit 420 includes the high-speed amplifier 150 that results in amplified output data stream 152A–152H. The integrated circuit 420 can also include signal processing and multiplexing capabilities to simplify interfacing the amplified output data stream 152A–152H with the remainder of the receiver 140.

As shown in FIG. 5, photodetector pixel 212 is electrically connected to the integrated circuit 420 via an In bump 430B. The space between the photodetector array 146 and the integrated circuit 420 not occupied by In bumps 430A–430D is filled with epoxy 432. The epoxy provides mechanical and thermal stability to the mated photodetector array 146/integrated circuit 420 structure. To ensure optical separation between adjacent photodetector pixels in the photodetector array 146, an epoxy separator 434B can be formed in the channel between adjacent photodetector pixels 211, 212. A grid of epoxy separators 434A–434E ensure optical separation through the photodetector array 146.

The operation of various embodiments of the present invention will now be examined in detail. In each of the embodiments, the received wavelength channels 144A–144H are absorbed in the elongate elements 400, 402.

While the elongate elements 400, 402 form a two-dimensional diffraction grating, due to the thickness of the elongate elements 400, 402, a three-dimensional diffractive resonant optical cavity (3D-DROC) is formed. By appropriately designing the 3D-DROC, the elongate elements 400, 402 absorb only the limited spectral range of the received wavelength channels 144A–144H that resonates therein. The resonating received wavelength channels 144A–144H generate the highest electric field regions, and thus absorption, within the elongate elements 400, 402. Due to the 3D-DROC, the quantum efficiency in this range of wavelengths remains high although significant radiation absorbing material has been removed. The use of 3D-DROCs enables this approach to have better out of band rejection than conventional broadband detectors, thereby increasing sensitivity.

In the preferred embodiment, the elongate elements 400, 402 are formed of GaAs/AlGaAs or InGaAs/GaAs multiple quantum well material and the absorbed radiation from the received wavelength channels 144A–144H creates electrical charge carriers (electrons). These electrical charge carriers create a change in the current between the electrical contacts 408, 410 when an external bias is applied across the electrical contacts 408, 410. Each of the photodetector pixels in the photodetector array 146 resonates, and therefore responds, to only one of the received wavelength channels 144A–144H. For this reason, the change in current for a specific photodetector pixel creates an output signal corresponding to a respective one of the output signals 148A–148H. High-speed amplifier 150 included in integrated circuit 420 amplifies each respective output signal 148A–148H, thus resulting in the amplified output data stream 152A–152H.

The resonant wavelength of the 3D-DROC is primarily a function of the elongate element 400, 402 geometry. The elongate elements 400 form a first diffraction grating while the elongate elements 402 form a second diffraction grating. Both diffraction gratings have the same period such that the 3D-DROC for a given photodetector will resonate at the wavelength of a respective wavelength channel. For maximum sensitivity, the first diffraction grating is perpendicular to and intersects the second diffraction grating. The simplest design variable in tuning the resonant wavelength of the 3D-DROC is the period between adjacent elongate elements 400, 402. By decreasing this period, the resonant wavelength decreases. Decreases in either the width or the thickness of the elongate elements 400, 402 will also decrease the resonant wavelength. The material used to form the elongate elements 400, 402 should absorb radiation at the same wavelength at which the 3D-DROC resonates. As an example, if the elongate elements 400, 402 are formed of GaAs/AlGaAs multiple quantum well material that absorbs radiation between 9 and 10 $\mu$m, the 3D-DROC formed by this material must likewise resonate between 9 and 10 $\mu$m for optimal performance.

To improve the performance of the receiver 140, one of the wavelength channels of the composite transmitted laser beam 130 would be a clock signal. By using the clock signal, a heterodyne signal detection algorithm can be implemented. The heterodyne signal detection algorithm only looks for a signal at predetermined times with respect to the clock signal. For example, the algorithm may ignore any signal detected when the clock signal is low, as this will correspond to noise. Only when the clock signal is high will the signal of the amplified output data stream 152A–152H be valid, leading to improved sensitivity.

The present invention offers several advantages over current multiple wavelength data communication systems. Depending upon the number of wavelength channels used and the spacing between adjacent wavelengths, the present invention would not require a second wavelength disperser 142. This could significantly simplify the design of the receiver 140.

When the elongate elements 400, 402 are formed of GaAs/AlGaAs multiple quantum well material, an extremely high-speed receiver 140 can result. GaAs/AlGaAs multiple quantum well material-based photodetectors have demonstrated response times to beyond 30 GHz. This is an order of magnitude faster than the 1.5 GHz demonstrated by HgCdTe-based photodetectors operating at the same wavelength. Thus, a receiver using GaAs/AlGaAs multiple quantum well material-based photodetectors could potentially have data transmission rates in excess of 1 Terrabyte per second depending upon the number of wavelength channels.

A further advantage of the present invention is due to its operating wavelength range. The photodetector array 146 can readily be designed to operate in the long wavelength infrared (LWIR) and is therefore compatible with the use of a $CO_2$ laser lasing at a number of wavelengths. The amount of power available with a $CO_2$ laser is many orders of magnitude greater than with most other laser sources. Therefore, a $CO_2$ laser-based communication system could operate over much longer distances without repeating stations in comparison to other laser-based systems. This offers the potential of an extremely high bandwidth communication system for use between satellites or between a satellite and a ground control station.

An additional application that readily lends itself to use of the disclosed receiver 140 is missile guidance. A number of missile systems are guided by radio frequency (RF) links between a ground control station and the missile, or the missile itself may have an RF seeker in its nose. As this RF link is susceptible to jamming, an optical link would be advantageous. This would simplify missile design and can reduce weight on missiles that incorporate RF seekers.

Although the present invention has been fully described by way of examples with reference to the accompanying drawings, various changes and modifications will be apparent to those skilled in the art. Therefore, such changes and modifications should be construed as being within the scope of the invention.

What is claimed is:

1. A high bandwidth multiple wavelength receiver suitable for use in a wavelength division multiplexing optical communication system, the communication system comprising a plurality of wavelength channels, each wavelength channel of the plurality of wavelength channels being of a different wavelength with respect to each of the remaining wavelength channels of the plurality of wavelength channels, the receiver comprising:

a plurality of photodetectors for receiving the plurality of wavelength channels, each individual one of the wavelength channels being received by at least one respective photodetector of the plurality of photodetectors, each individual one of the photodetectors thereby creating at least a portion of a respective wavelength channel signal, and a plurality of high speed amplifiers, the number of high speed amplifiers being equal to the number of the plurality of photodetectors, each individual one of the high speed amplifiers being connected to a respective one of the plurality of photodetectors, each individual one of the high speed amplifiers being for amplifying a respective portion of the respective wavelength channel signal, wherein each individual one of the photodetectors comprises:
  a plurality of first elongate elements for absorbing a respective wavelength channel and thereby creating electrical carriers, the plurality of first elongate elements forming a first diffraction grating for a respective wavelength channel;
  a plurality of second elongate elements for absorbing said respective wavelength channel and thereby creating electrical carriers, the plurality of second elongate elements forming a second diffraction grating for said respective wavelength channel, a period of the second diffraction grating being equal to a period of the first diffraction grating, the plurality of second elongate elements being substantially perpendicular to and intersecting the plurality of first elongate elements so as to form a two-dimensional diffraction grating having a first common major surface and a second common major surface, said second common major surface being opposite the first common major surface;
  a first electrical contact disposed on the first common major surface of the two-dimensional diffraction grating;
  a second electrical contact disposed on the second common major surface of the two-dimensional diffraction grating, the first electrical contact and the second electrical contact being disposed so as to provide for electrical carrier flow through the two-dimensional diffraction grating thereby creating a respective wavelength channel signal; and
  a reflector for reflecting the respective wavelength channel, the reflector being disposed on a surface of the second electrical contact, the surface being remote from the second common major surface.

2. A high bandwidth multiple wavelength receiver in accordance with claim 1, wherein the number of the photodetectors is equal to an odd integer multiple of the number of the wavelength channels.

3. A high bandwidth multiple wavelength receiver in accordance with claim 2, wherein the high bandwidth multiple wavelength receiver utilizes each respective portion of a respective wavelength channel signal to reduce noise.

4. A high bandwidth multiple wavelength receiver in accordance with claim 1, wherein each of the plurality of first elongate elements, each of the plurality of second elongate elements, each first electrical contact, and each second electrical contact comprises semiconductor material.

5. A high bandwidth multiple wavelength receiver in accordance with claim 4, wherein the semiconductor material comprises III–V semiconductor material.

6. A high bandwidth multiple wavelength receiver in accordance with claim 5, wherein the semiconductor material comprises AlGaAs/GaAs semiconductor material.

7. A high bandwidth multiple wavelength receiver in accordance with claim 5, wherein the semiconductor material comprises InGaAs/InP semiconductor material.

8. A high bandwidth multiple wavelength receiver in accordance with claim 1, wherein each of the plurality of first elongate elements and each of the plurality of second elongate elements comprises multiple quantum well infrared absorbing semiconductor material.

9. A high bandwidth multiple wavelength receiver in accordance with claim 8,
  wherein the multiple quantum well infrared absorbing semiconductor material comprises III–V semiconductor material, and
  wherein the first electrical contact and the second electrical contact comprise doped III–V semiconductor material.

10. A high bandwidth multiple wavelength receiver in accordance with claim 1, wherein each reflector comprises a metal or a metal alloy.

11. A high bandwidth multiple wavelength receiver in accordance with claim 1, wherein each reflector comprises a Bragg reflector.

12. A high bandwidth multiple wavelength receiver in accordance with claim 1,
  wherein each first electrical contact and each second electrical contact comprises n-type GaAs semiconductor material,
  wherein each of the plurality of first elongate elements and each of the plurality of second elongate elements comprises multiple quantum well infrared absorbing semiconductor material, and
  wherein each reflector comprises a metal or a metal alloy.

13. A high bandwidth multiple wavelength receiver in accordance with claim 1, wherein the plurality of wavelength channels comprise infrared radiation.

14. A high bandwidth multiple wavelength receiver in accordance with claim 1, wherein the plurality of wavelength channels are generated by a carbon dioxide laser.

15. A high bandwidth multiple wavelength receiver in accordance with claim 14, wherein the plurality of wavelength channels generated by the carbon dioxide laser correspond to P transitions.

16. A high bandwidth multiple wavelength receiver in accordance with claim 14, wherein the plurality of wavelength channels generated by the carbon dioxide laser correspond to R transitions.

17. A high bandwidth multiple wavelength receiver in accordance with claim 1, wherein the plurality of wavelength channels are generated by at least one quantum cascade laser.

18. A high bandwidth multiple wavelength receiver in accordance with claim 1, wherein one of the plurality of wavelength channels is a clock signal wavelength channel.

19. A high bandwidth multiple wavelength receiver in accordance with claim 18,
  wherein at least one of the plurality of photo detectors absorbs the clock signal wavelength channel thereby creating a received clock signal, and
  wherein the high bandwidth multiple wavelength receiver uses the thus received clock signal for heterodyne detection of the plurality of wavelength channels.

20. A high bandwidth multiple wavelength receiver in accordance with claim 1 further comprising an optical disperser, the optical disperser for dispersing each wavelength channel of the plurality of wavelength channels onto at least one respective photodetector.

21. A method for receiving a high bandwidth multiple wavelength, wavelength division multiplexing optical communication data stream, the communication data stream comprising a plurality of wavelength channels, each wavelength channel of the plurality of wavelength channels being of a different wavelength with respect to each of the remaining wavelength channels of the plurality of wavelength channels, the method comprising the steps of:
  utilizing a plurality of photodetectors to receive the plurality of wavelength channels, each individual one of the wavelength channels being absorbed by at least one respective photodetector of the plurality of photodetectors, each individual one of the photodetectors outputting at least a portion of a respective wavelength channel signal based on a thus absorbed respective one of the plurality of wavelength channels, each individual one of the photodetectors comprises a plurality of first elongate elements for absorbing a respective one of the plurality of wavelength channels and thereby creating electrical carriers, the plurality of first elongate elements forming a first diffraction grating for said respective one of the plurality of wavelength channels and a plurality of second elongate elements for absorbing said respective one of the plurality of wavelength channels and thereby creating electrical carriers, the plurality of second elongate elements forming a second diffraction grating for said respective one of the plurality of wavelength channels, a period of the second diffraction grating being equal to a period of the first diffraction grating, the plurality of second elongate elements being substantially perpendicular to and intersecting the plurality of first elongate elements so as to form a two-dimensional diffraction grating; and amplifying each respective thus generated portion of a respective wavelength channel signal with a respective high speed amplifier to provide a thus amplified portion of a wavelength channel signal for each respective one of the plurality of photodetectors.

22. A method for receiving a high bandwidth multiple wavelength, wavelength division multiplexing optical communication data stream in accordance with claim 21, wherein the number of the photodetectors is equal to an odd integer multiple of the number of the wavelength channels.

23. A method for receiving a high bandwidth multiple wavelength, wavelength division multiplexing optical communication data stream in accordance with claim 22, wherein the high bandwidth multiple wavelength receiver utilizes each respective portion of a respective wavelength channel signal to reduce noise.

24. A method for receiving a high bandwidth multiple wavelength, wavelength division multiplexing optical communication data stream in accordance with claim 21, wherein each of the diffractive resonant optical cavities comprises semiconductor material.

25. A method for receiving a high bandwidth multiple wavelength, wavelength division multiplexing optical communication data stream in accordance with claim 24, wherein the semiconductor material comprises III–V semiconductor material.

26. A method for receiving a high bandwidth multiple wavelength, wavelength division multiplexing optical communication data stream in accordance with claim 25, wherein the semiconductor material comprises AlGaAs/GaAs semiconductor material.

27. A method for receiving a high bandwidth multiple wavelength, wavelength division multiplexing optical communication data stream in accordance with claim 25, wherein the semiconductor material comprises InGaAs/InP semiconductor material.

28. A method for receiving a high bandwidth multiple wavelength, wavelength division multiplexing optical communication data stream in accordance with claim 21, wherein each of the diffractive resonant optical cavities comprises multiple quantum well infrared absorbing semiconductor material.

29. A method for receiving a high bandwidth multiple wavelength, wavelength division multiplexing optical communication data stream in accordance with claim 21, wherein each of the plurality of wavelength channels comprises infrared radiation.

30. A method for receiving a high bandwidth multiple wavelength, wavelength division multiplexing optical communication data stream in accordance with claim 29, wherein each of the plurality of wavelength channels is generated by a carbon dioxide laser.

31. A method for receiving a high bandwidth multiple wavelength, wavelength division multiplexing optical communication data stream in accordance with claim 30, wherein each of the plurality of wavelength channels generated by the carbon dioxide laser corresponds to at least one of P and R transitions.

32. A method for receiving a high bandwidth multiple wavelength, wavelength division multiplexing optical communication data stream in accordance with claim 21, wherein each of the plurality of wavelength channels is generated by at least one quantum cascade laser.

33. A method for receiving a high bandwidth multiple wavelength, wavelength division multiplexing optical communication data stream in accordance with claim 21, wherein generating the plurality of wavelength channels includes the steps of:

generating light having a plurality of wavelengths, and modulating light of each individual wavelength of the light having a plurality of wavelengths thereby creating the plurality of wavelength channels.

34. A method for receiving a high bandwidth multiple wavelength, wavelength division multiplexing optical communication data stream in accordance with claim 33, wherein the step of generating light uses a carbon dioxide laser.

35. A method for receiving a high bandwidth multiple wavelength, wavelength division multiplexing optical communication data stream in accordance with claim 34, wherein the step of generating light uses at least one quantum cascade laser.

36. A high bandwidth wavelength division multiplexing optical communication system, the communication system comprising a plurality of wavelength channels, each wavelength channel of the plurality of wavelength channels being of a different wavelength with respect to each of the remaining wavelength channels of the plurality of wavelength channels, the communication system comprising:

a transmitter for transmitting the plurality of wavelength channels, the transmitter including:

one or more light sources, each light source producing light of at least one wavelength, the transmitter thereby producing light having a plurality of wavelengths;

an optical modulator array, each element of the modulator array for receiving light corresponding to one of the plurality of wavelengths, each element of the modulator array for modulating the thus received light according to input data, the modulator array thereby producing the plurality of wavelength channels and transmitting the plurality of wavelength channels to a receiver, and the receiver for receiving the plurality of wavelength channels, the receiver including:

a plurality of photodetectors for receiving the plurality of wavelength channels, a quantity of the plurality of photodetectors being equal to an integer multiple of a quantity of the plurality of wavelength channels, each one of the plurality of photodetectors for absorbing a respective one of the plurality of wavelength channels and thereby creating a respective wavelength channel signal, and a plurality of high speed amplifiers, a quantity of the plurality of high speed amplifiers being equal to the quantity of the plurality of photodetectors, each one of the plurality of high speed amplifiers connected to a respective one of the plurality of photodetectors, each one of the plurality of high speed amplifiers for amplifying a respective wavelength channel signal and thereby producing a respective output data stream, wherein each one of the plurality of photodetectors includes:

a plurality of first elongate elements for absorbing a respective wavelength channel signal thereby creating electrical carriers, the plurality of first elongate elements comprises a first diffraction grating for the respective wavelength channel;

a plurality of second elongate elements for absorbing the respective wavelength channel thereby creating electrical carriers, the plurality of second elongate elements comprises a second diffraction grating for the respective wavelength channel, a period of the second diffraction grating being equal to a period of the first diffraction grating, the plurality of second elongate elements being substantially perpendicular to and intersecting the plurality of first elongate elements so as to form a two-dimensional diffraction grating having a first common major surface and a second common major surface opposite the first common major surface;

a first electrical contact disposed on the first common major surface of the two-dimensional diffraction grating;

a second electrical contact disposed on the second common major surface of the two-dimensional diffraction grating, the first electrical contact and the second electrical contact being disposed so as to provide for electrical carrier flow through the two-dimensional diffraction grating thereby creating a respective wavelength channel signal; and a reflector for reflecting the respective wavelength channel, the reflector being disposed on a lateral surface of the second electrical contact, the lateral surface opposite the second common major surface with respect to the second electrical contact.

37. A high bandwidth wavelength division multiplexing optical communication system in accordance with claim 36, wherein the one or more light sources is a carbon dioxide laser.

38. A high bandwidth wavelength division multiplexing optical communication system in accordance with claim 36, wherein the one or more light sources is at least one quantum cascade laser.

39. A high bandwidth wavelength division multiplexing optical communication system in accordance with claim 36, wherein the transmitter further includes an optical disperser, the optical disperser for dispersing light of a single wavelength from the light having a plurality of wavelengths onto a respective element of the optical modulator array.

40. A high bandwidth wavelength division multiplexing optical communication system in accordance with claim 36, wherein the transmitter further includes a lens system for combining each of the plurality of wavelength channels into a single light beam for transmission to the receiver.

41. A high bandwidth wavelength division multiplexing optical communication system in accordance with claim 36, wherein the transmitter further includes:

an optical disperser, the optical disperser for dispersing light of a single wavelength from the light having a plurality of wavelengths onto a respective element of the optical modulator array; and a lens system for combining each of the plurality of wavelength channels into a single light beam for transmission to the receiver.

42. A high bandwidth wavelength division multiplexing optical communication system in accordance with claim 36, wherein the receiver further includes a lens system for collecting the transmitted plurality of wavelength channels.

43. A high bandwidth wavelength division multiplexing optical communication system in accordance with claim 36, wherein the receiver further includes an optical disperser, the optical disperser for dispersing light of a single wavelength from the received plurality of wavelength channels onto a respective one of the plurality of photodetectors.

44. A high bandwidth wavelength division multiplexing optical communication system in accordance with claim 36, wherein the receiver further includes:

a lens system for collecting the transmitted plurality of wavelength channels; and an optical disperser, the optical disperser for dispersing light of a single wavelength from the received plurality of wavelength channels onto a respective one of the plurality of photodetectors.

45. A high bandwidth wavelength division multiplexing optical communication system in accordance with claim 36, wherein one of the plurality of wavelength channels is a clock signal wavelength channel.

46. A high bandwidth wavelength division multiplexing optical communication system in accordance with claim 45, wherein one of the plurality of photodetectors absorbs the clock signal wavelength channel thereby creating a received clock signal, and wherein the receiver uses the thus received clock signal for heterodyne detection of the plurality of wavelength channels.

47. A high bandwidth wavelength division multiplexing optical communication system in accordance with claim 36, wherein the communication system transmits data from one satellite to another satellite.

48. A high bandwidth wavelength division multiplexing optical communication system in accordance with claim 36, wherein the communication system transmits data from a ground control station to a satellite.

49. A high bandwidth wavelength division multiplexing optical communication system in accordance with claim 36, wherein the communication system transmits data from one naval vehicle to another naval vehicle.

50. A high bandwidth wavelength division multiplexing optical communication system in accordance with claim 36, wherein the communication system transmits data from a ground control station to a missile.

* * * * *